(12) United States Patent
Tirtowidjojo et al.

(10) Patent No.: US 6,194,541 B1
(45) Date of Patent: Feb. 27, 2001

(54) CENTRIFUGAL METHOD AND APPARATUS FOR DEVOLATILIZING POLYMERS

(75) Inventors: Dan Tirtowidjojo, Lake Jackson, TX (US); George J. Quarderer, Jr., Midland, MI (US); Clark J. Cummings, Midland, MI (US); Eugene R. Moore, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/307,113

(22) Filed: May 7, 1999

Related U.S. Application Data

(60) Provisional application No. 60/089,059, filed on Jun. 12, 1998.

(51) Int. Cl.[7] ..................................... C08F 6/00
(52) U.S. Cl. .............................................. 528/482
(58) Field of Search ................................. 528/482

(56) References Cited

U.S. PATENT DOCUMENTS 4,940,472  7/1990  Hay, II et al. ...................... 528/481
4,952,672 * 8/1990  Moore et al. ....................... 528/481

OTHER PUBLICATIONS

Haw, Jimkuo; Mass Transfer of Centrifugally Enhanced Polymer Devolatilization by Using Foam Metal Packed Bed; Jan. 1995; Case Western Reserve University.

* cited by examiner

Primary Examiner—Terressa M. Boykin

(57) ABSTRACT

A method for devolatilization of a thermoplastic polymer containing at least one volatile component which includes the following three steps: heating the thermoplastic polymer so that the thermoplastic polymer is a heated liquid or molten thermoplastic polymer, flowing the heated liquid thermoplastic polymer through a packed bed liquid-gas contactor by centrifugal force, and flowing a stripping gas through the packed bed countercurrent to the flow of the heated liquid thermoplastic polymer so that the volatile component volatilizes into the stripping gas from the heated liquid thermoplastic polymer by gas-liquid contacting in the packed bed; and an apparatus therefor.

22 Claims, 2 Drawing Sheets

CENTRIFUGAL METHOD AND APPARATUS FOR DEVOLATILIZING POLYMERS

This application claims benefit of 60/089,059 filed Jun. 12, 1998.

BACKGROUND OF THE INVENTION

The instant invention relates to the removal of volatile components from thermoplastic polymers and more specifically to methods and apparatus therefore that use centrifugal force.

Chisholm, U.S. Pat. No. 3,409,712, herein fully incorporated by reference, disclosed a method and apparatus for devolatilization of thermoplastic polymers by melting the polymer and flowing the melted polymer on a rotating disk surface. Chisholm, U.S. Pat. No. 3,424,832, herein fully incorporated by reference, disclosed a method and apparatus for pelletizing a thermoplastic polymer using a rotating chamber or hollow rotor. Hay, II et al., U.S. Pat. No. 4,940,472, herein fully incorporated by reference, disclosed a method and apparatus for devolatilization of thermoplastic polymers by melting the polymer and flowing the melted polymer on a rotating disk surface. Moore et al., U.S. Pat. No. 4,952,672, herein fully incorporated by reference, disclosed a method and apparatus for devolatilization of thermoplastic polymers by melting the polymer and flowing the melted polymer on a rotating disk surface. Baker Perkins Incorporated of Saginaw Michigan offered a centrifugal pelletizer for sale. Modern Plastics, December 1983, page 56. Haw, Master's Thesis, Case Western Reserve University, January 1995, entitled "Mass Transfer of Centrifugally Enhanced Polymer Devolatilization by using Foam Metal Packed Bed", herein fully incorporated by reference, disclosed a method and apparatus for devolatilization of thermoplastic polymers by melting the polymer and flowing the melted polymer through a open-cell nickel metal foam gas-liquid contactor rotated within a stationary chamber.

The method and apparatus of Haw suffered from several problems. For example, the nickel metal foam tended to collapse under the centrifugal forces to which it was subjected. In addition, the mechanical seal used tended to contaminate the devolatilized polymer with the seal oil. Furthermore, the method and apparatus of Haw did not produce the devolatilized polymer in the form of pellets.

SUMMARY OF THE INVENTION

The instant invention is a method for devolatilization of a thermoplastic polymer containing at least one volatile component which comprises three steps. The first step is to heat the thermoplastic polymer so that the thermoplastic polymer is a heated liquid or molten thermoplastic polymer. The second step is to flow the heated liquid thermoplastic polymer through a packed bed liquid-gas contactor by centrifugal force. The third step is to flow a stripping gas through the packed bed countercurrent to the flow of the heated liquid thermoplastic polymer so that the volatile component volatilizes into the stripping gas from the heated liquid thermoplastic polymer by gas-liquid contacting in the packed bed.

The instant invention is also an apparatus for devolatilization of a thermoplastic polymer containing at least one volatile component, the apparatus comprising three elements. The first element is a rotatable chamber, the rotatable chamber containing a packing for gas-liquid contact processing. The second element is a polymer conduit, the polymer conduit extending into and terminating within the rotatable chamber so that molten thermoplastic polymer can be flowed into the chamber by way of the conduit while the chamber is being rotated so that the molten thermoplastic polymer then flows through the packing by centrifugal force so that the volatile component of the molten thermoplastic polymer volatilizes into the gas phase in the packed bed. The third element is a gas seal between the polymer conduit and the rotatable chamber.

DETAILED DESCRIPTION OF INVENTION

Figure 1A:
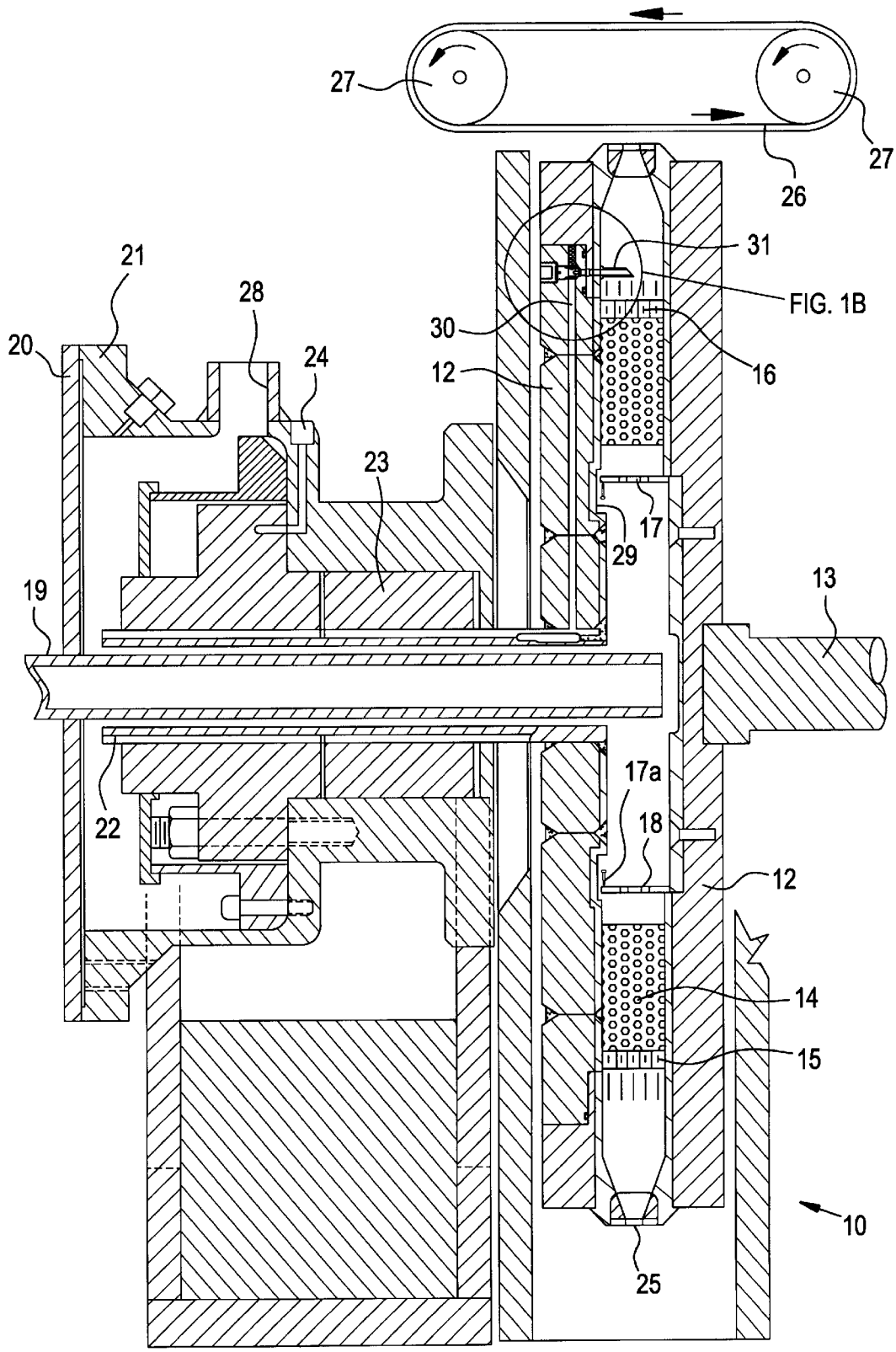
FIG. 1 shows a side cross sectional view of an apparatus embodiment of the instant invention.
Figure 1B:
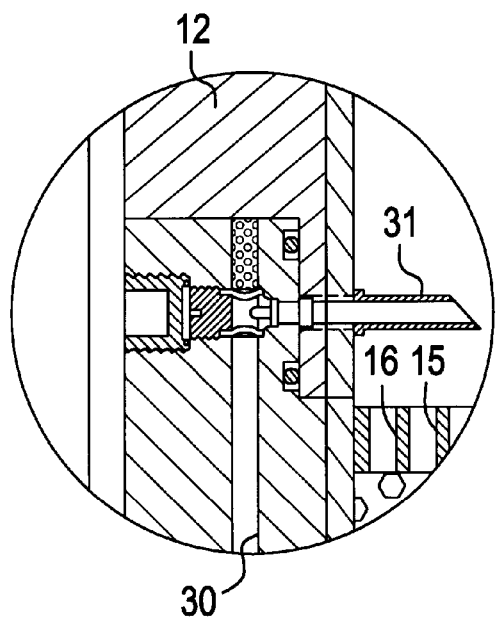

Referring now to FIG. 1, therein is shown a side cross sectional view of an apparatus embodiment 10 of the instant invention. The apparatus 10, includes a disk shaped chamber 12 which is rotated by a shaft 13 about the longitudinal axis of the shaft 13. The shaft 13 is rotated by an electric motor (not shown). The chamber 12 contains an annular ring of nickel-chromium metal open cell foam packing 14 preferably cut from a larger piece of material by the electrode discharge machining process. The packing 14 is Celmet Brand #1 material available from Sumitomo Electric USA, NY, N.Y. A ring shaped support band 15 surrounds the packing 14. The support band 15 is perforated by holes 16 therethrough. A ring shaped distributor band 17 is positioned on the inside of the packing 14. The distributor band 17 is perforated by holes 18 therethrough.

A polymer conduit 19 extends into and terminates within the chamber 12. The polymer conduit 19 includes flange 20 and seal mounting body 21. A tubular chamber extension 22 terminates near the flange 20. A gas seal 23 is mounted in the seal mounting body 21. The details of the gas seal 23 are not shown in FIG. 1. A preferred gas seal 23 is available from the Durametallic Corporation of Kalamazoo Michigan as the GF 200 Dura Seal Brand gas barrier seal. Nitrogen at 0.2 MPa pressure is fed to the seal 23 by way of nitrogen port 24. Gas barrier seals are known to chemical engineers. See, for example, Chemical Engineering Progress (1996), 92 (10), pages 58–63, herein fully incorporated by reference.

The term thermoplastic polymer is well understood in the art and includes, for example and without limitation, nylons, fluorocarbons, cellulose derivatives, acrylic resins, polystyrene, copolymers of styrene such as acrylonitrile/butadiene/styrene copolymers, ethylene/styrene interpolymers, polylactic acid, polyethylene and polyproyplene. Thermoplastic polymers soften and become molten when sufficiently heated. It is often desirable to reduce the concentration of volatile components in a thermoplastic polymer as discussed in U.S. Pat. Nos. 4,952,672, 4,940,472 and 3,409,712. For example, it is often desirable to reduce the concentration of residual styrene monomer in polystyrene.

The thermoplastic polymer is heated as discussed in U.S. Pat. Nos. 4,952,672 and 4,940,472 so that it can be flowed through the polymer conduit 19 and into the chamber 12. The chamber 12 is rotated by way of the shaft 13 at, for example, 4,000 rpm for a 46 centimeter outside diameter chamber. The liquid molten heated thermoplastic polymer then is pooled by centrifugal force against the distributor band 17 aided by lip 17a. The polymer then flows by centrifugal force through the holes 18, through the packing 14, through the holes 16 to pool at the peripheral edge of the chamber 12. A series of apertures 25 are positioned in the periphery of the chamber 12. Polymer flows by centrifugal force through the apertures 25 to form a strand of polymer. An endless band 26 of sharpened alloy tool steel forms a knife edge which cuts the strand of polymer into pellets. The band 26 travels on rollers 27 driven by an electric motor (not shown). The band 26 is preferably water cooled.

The packing 14 facilitates gas-liquid contacting. Gas-liquid contacting is a technique known to chemical engineers. See, for example, Section 18–19 to 18–48 of Perry's Chemical Engineers' Handbook, fifth edition. When a partial vacuum (defined herein as a pressure more than 0 MPa but less than 0.1 MPa) is applied to vacuum port 28, then volatile components of the polymer enter into the gas phase in the packing 14, flow around the distributor band 17 by way of vent channel 29 in the chamber 12, into the annulus between the conduit 19 and the extension 22, and then through the port 28.

Optionally, the chamber 12 contains a stripping gas conduit 30 so that nitrogen from the port 24 can be introduced into the chamber 12 by way of nozzle 31. The stripping gas flows through the holes 16, through the packing 14, through the channel 29, into the annulus between the conduit 19 and the extension 22, and then through the port 28. Any conventionally applicable stripping gas can be used such as carbon dioxide, methanol vapor, ethanol vapor, butane gas or other light hydrocarbons. For example, steam can be flowed through the conduit 30 as a stripping gas. Alternatively, the stripping gas conduit can extend through the shaft 13 into the chamber 12. When the stripping gas is steam, then the preferred material of construction of the chamber 12 is a corrosion resistant steel. The use of a stripping gas is preferred in the instant invention when it is desirable to devolatilize more completely at the expense of handling the stripping gas.

Figure 2:
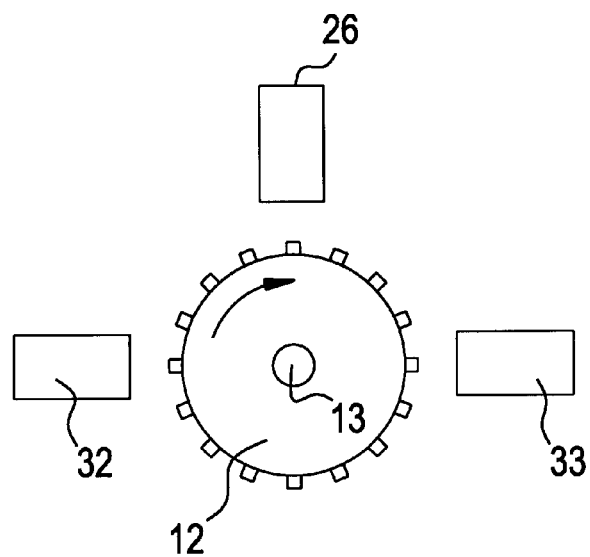
FIG. 2 shows an end view of the apparatus of FIG. 1 further including a pair of electromagnets.

Preferably, the chamber 12 is heated to facilitate the start up and operation of the apparatus 10. The preferred means to heat the chamber 12 is shown in FIG. 2. FIG. 2 is an end view of the apparatus 10 of FIG. 1 showing the chamber 12, the shaft 13, the band 26 and the apertures 25. The chamber 12 is positioned between a first electromagnet 32 and a second electromagnet 33. When the chamber 12 is made of a magnetic material, then when the chamber 12 is rotated, eddy electrical currents are generated in the chamber 12 which heat the chamber 12. Preferably, the chamber 12 is made of a magnetic stainless steel (especially when steam is used as a stripping gas) such as the well known 17-4 PH type of stainless steel, see Section 6–38 of Marks' Standard Handbook for Mechanical Engineers, eighth edition.

The packing of the instant invention must not collapse in use and thereby block the flow of polymer through the packing. Haw, supra, disclosed the use of open cell nickel metal foam as a packing in a centrifugal polymer devolatilizer. However, preferably the packing of the instant invention has a compressive strength at least twenty five percent greater than an equivalent packing made essentially of nickel. When the packing is an open cell metal foam, then preferably the average number of cells per centimeter of the foam ranges from about 2 to about 7. However, an open-cell metal foam is not required in the instant invention. For example, a packing comprised of a knitted metal wire, such as knitted stainless steel wire, can be used as well as any other packing known to the liquid-gas contacting art. Other examples of packing include macroreticular metal foam, wire screen, and wound woven metallic mesh When a loose packing is used, then a perforated band like the support band 15 can be used on the inner side of the packing. However, a rigid packing, such as open cell metal foam, is believed to be easier to balance.

FIG. 1 shows a chamber 12 having a single row of apertures 25. However, it is preferred that the chamber 12 be longer and have many rows of apertures 25 to increase the productivity of the apparatus 10. When a longer chamber 12 is used, then the end of the polymer conduit 19 can be closed and the polymer conduit adjacent the packing can then be perforated with holes to distribute molten polymer onto the packing 14.

The operational parameters of the apparatus of the instant invention will depend, of course, on many factors such as the specific physical properties of the thermoplastic polymer being devolatilized. However, a good starting point is to follow the teachings of U.S. Pat. No. 4,952,672. When the thermoplastic polymer is general purpose polystyrene, then it is suggested that the polymer and chamber 12 be heated to about 240 degrees centigrade so that the polymer has a viscosity of about 300,000 centipoise.

What is claimed is:

1. An improved method for devolatilization of a thermoplastic polymer containing at least one volatile component comprising the steps of: heating the thermoplastic polymer so that the thermoplastic polymer is a heated liquid thermoplastic polymer; and flowing the heated liquid thermoplastic polymer through a chamber by centrifugal force; the improvement comprising flowing the heated liquid thermoplastic polymer through a packed bed by centrifugal force, wherein the packing is of sufficient strength and does not collapse in use and block the flow of polymer through the packing; and optionally flowing a stripping gas through the packed bed countercurrent to the flow of the heated liquid thermoplastic polymer, such that the volatile component volatilizes from the heated liquid thermoplastic polymer by gas-liquid contacting in the packed bed.

2. The method of claim 1, wherein the stripping gas is selected from the group consisting of nitrogen, carbon dioxide, butane, methanol and ethanol.

3. The method of claim 1, wherein the stripping gas is steam.

4. The method of claim 1, wherein the pressure of the stripping gas in the packed bed is more than 0 MPa but less than 0.1 MPa.

5. The method of claim 2, wherein the pressure of the stripping gas in the packed bed is more than 0 MPa but less than 0.1 MPa.

6. The method of claim 3, wherein the pressure of the stripping gas in the packed bed is more than 0 MPa but less than 0.1 MPa.

7. The method of claim 1, wherein the packing has a compressive strength at least twenty five percent greater than an equivalent packing made essentially of nickel.

8. The method of claim 1, wherein the packing is an open cell metal foam, the metal being an alloy of nickel and chromium, the foam having a compressive strength at least twenty five percent greater than if the foam were made essentially of nickel.

9. The method of claim 8, wherein the average number of cells per centimeter of the foam ranges from about 2 to about 7.

10. The method of claim 1, further comprising the step of flowing the devolatilized thermoplastic polymer through an aperture to form a strand of devolatilized thermoplastic polymer.

11. The method of claim 10, further comprising the step of cutting the strand of devolatilized thermoplastic polymer to form a pellet of devolatilized thermoplastic polymer.

12. An improved apparatus for devolatilization of a thermoplastic polymer containing at least one volatile component, comprising a rotatable chamber, a polymer conduit, the polymer conduit extending into and terminating within the rotatable chamber so that molten thermoplastic polymer can be flowed into the chamber by way of the conduit while the chamber is being rotated, and a gas seal between the polymer conduit and the rotatable chamber; wherein the improvement comprises the rotatable chamber containing a packing of sufficient strength such that it does not collapse during use for gas-liquid contact processing.

13. The apparatus of claim 12, wherein the packing is an open-cell metal foam.

14. The apparatus of claim 13, wherein the open-cell metal foam is an alloy of nickel and chromium.

15. The apparatus of claim 12, wherein the packing comprises knitted metal wire.

16. The apparatus of claim 15, wherein the metal wire is stainless steel metal wire.

17. The apparatus of claim 12, further comprising a magnet, the rotatable chamber comprising a magnetic metal, the rotatable chamber being positioned sufficiently near the magnet so that when the rotatable chamber is rotated, the rotatable chamber is heated by eddy currents induced in the magnetic metal.

18. The apparatus of claim 17, wherein the magnetic metal is a magnetic stainless steel.

19. The apparatus of claim 18, wherein the magnetic stainless steel is 17-4PH type magnetic stainless steel.

20. The apparatus of claim 12, further comprising a stripping gas conduit extending into and terminating within the rotatable chamber so that a stripping gas can be flowed through the packed bed countercurrent to the flow of molten polymer.

21. The apparatus of claim 12, wherein the periphery of the rotatable chamber includes at least one aperture so that the devolatilized thermoplastic polymer can flow through the aperture to form a strand of devolatilized thermoplastic polymer when the rotatable chamber is rotated.

22. The apparatus of claim 21, further including a knife positioned near the periphery of the rotatable chamber so that the strand of devolatilized thermoplastic polymer can be cut into a pellet of devolatilized thermoplastic polymer by the knife when the rotatable chamber is rotated.

* * * * *